J. S. CARSON.
Churn Dasher.
No. 81,340.
Patented Aug. 25, 1868.
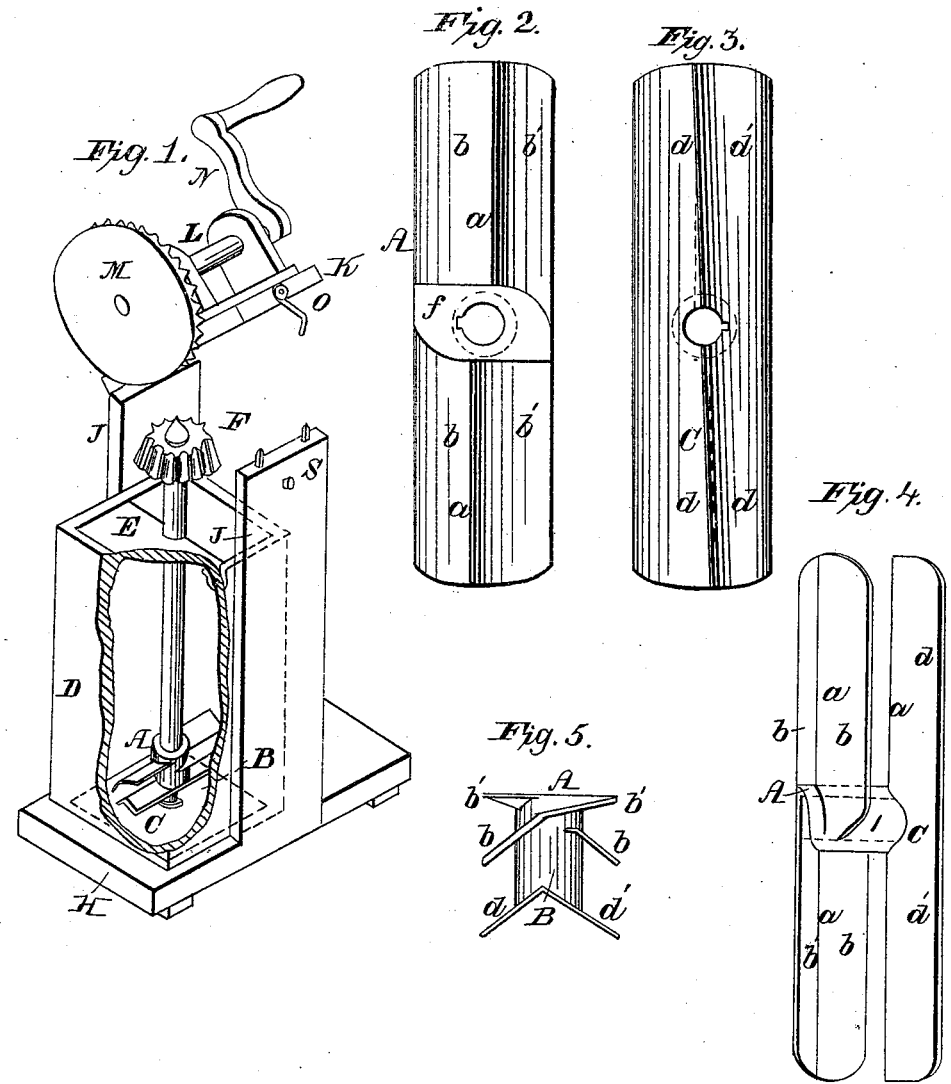

United States Patent Office.

JOHN S. CARSON, OF BROOKHAVEN, MISSISSIPPI.

*Letters Patent No. 81,340, dated August 25, 1868.*

IMPROVEMENT IN CHURN-DASHER.

The Schedule referred to in these Letters Patent and making part of the same.

TO ALL WHOM IT MAY CONCERN:

Be it known that I, JOHN S. CARSON, of Brookhaven, in the county of Lawrence, and State of Mississippi, have invented a certain new, useful, and improved Churn-Dasher, and mode of operating it; and I do hereby declare the following to be a full, clear, and exact description of the same, reference being had to the annexed drawing, making a part of this specification, in which—

Figure 1 is a perspective view of a churn, with a part of it broken away to exhibit the dasher, and the means for operating it.

Figure 2, a top view of the upper cross-plate and wings of the dasher.

Figure 3, a bottom view of the lower cross-plate or wings.

Figure 4, a side view of both the upper and lower cross-plates, and

Figure 5, an end view of the same.

My invention has in view the attainment of the same objects that are sought to be accomplished by every improvement in churn-dashers and churns that has ever been devised, to wit, to obtain the largest possible yield of butter from any given quantity of milk, and with the least possible expenditure or consumption of time and labor. Hence it consists not only of an improvement in dashers, by which a violent agitation of the milk is secured by the establishment of rapid diverse and opposing currents therein, and a consequent complete breaking up of the minute vesicles in which the butter is contained is effected, but also, in combination with said dasher, of an adjustable cross-table, on which to place and secure the mechanism to operate the same, the object of the adjustability of said table being to get it out of the way whenever the churn is to be opened for inspection, to be cleaned, or for any other purpose.

The most important part of my invention, to wit, my improved dasher, consists of two thin metallic cross-plates, through the centre of which the spindle of the churn passes, and to which they are attached, near the lower extremity thereof, so formed that both ends of each constitute peculiarly-constructed wings, that occupy novel but definite relations to each other, that nevertheless vary as to certain parts of the same, in order, with absolute certainty, to effect the object that is sought by me. In other words, the extremities of the two cross-plates of my dasher are so formed as to provide an open space between them, which, in their rotation in one direction, concentrates or packs the milk with a compressive force that is proportionate to the rapidity of the revolution, by reason of the flaring formation of said space, and hence secures an excessive agitation of the milk at the point of its exit from the same, and for some distance therefrom, whilst, when the dasher is rotated in the other direction, the milk that passes through the open space is diffused or scattered, so to speak, by reason of the expanding proportions of said space in the direction it is flowing. I use this expression in a relative sense, for the dasher moves, and not the milk, and hence a totally different description of currents is thereby set in motion.

Moreover, in consequence of the form of the wings of my dasher, partial vacuums are produced above and below it, whether it be rotated in one or the other direction, behind the crest or apex of such wing, and beneath the lower plate, where there is an angular space exactly corresponding with the length and form of this plate, which, in the rush of the milk thereinto, tend still further to agitate the same in a violent manner, and to quicken the formation of the butter.

But my invention will be better understood by referring to the drawings, on which the same letters denote the same parts at all the figures. On the drawings, A is the upper cross-plate of my dasher, and $a\ a'$ the two wings thereof. These wings are precisely like each other, but the wide sections thereof, by which I mean that part of each which, with respect to the longitudinal flexure that produces the angular formation of them, contains the largest plane or flat surface, are on opposite sides of the plate, as shown at $b\ b'$, and hence, in the rotation of the dasher, these widest sections are both in front or both in the rear, accordingly as the rotation is in one or the other direction. The angle between the two sections or surfaces that obtains in each wing in consequence of the flexure is about fifteen degrees.

In relation to the spindle, the wing $a$ projects upwardly at precisely the same angle as the wing $a'$, the widest surface-section of both being uppermost, as shown, and connected with each other by the collar B and plate $f$, which are cast with them and the lower plate at one operation. In consequence of the above arrangement, the contiguity of the plate A is necessarily broken at the collar B, so that, in strictness of language, it might more properly be said to be two plates, each constituting a distinct wing. The lower plate C is continuous from one end to the other, as shown clearly at figs. 3 and 5, and in order to secure in it a wide and a narrow, or, more accurately, a wider and a narrower angular face on each side of the spindle, so that it will correspond in these particulars with the upper plate A, the line of flexure is oblique, as shown clearly at fig. 3. The plate being bent along such a line, not only secures an inequality of dimensions in the two sections $d$ and $d'$ of each wing of this plate, but also throws the widest and narrowest sections on reverse sides of the plate, as clearly shown at fig. 3. Or the two wings or ends of the plate C may be divided into two unequal surfaces, at an angle to each other, by bending the same along the dotted lines shown at fig. 3, from the spindle outwardly, and this, perhaps, will be the best mode of accomplishing the desired object. The flexure in the plate C is sufficient to make the angle between the two sections of each wing about thirty degrees, or doubly as great as it is in the upper wings. This being so, it at once will be seen that if either of the two opposing sections of the upper and lower wings be placed parallel to each other, the other sections will occupy an oblique relation, and that the space between them will be flaring, or wider at the edges of the plate than at the point at which the parallelism as between the opposing surfaces ceases. It will be seen, further, that if the parallelism is upon reverse sides of the plates, the flaring openings will also be on reverse sides, and that hence they will either be in front or on the rear sides of the dasher, accordingly as the butter is rotated to the right hand or to the left.

My dasher is intended to be made of metal, and I prefer to cast it in a single piece, but it may obviously be made in sections, if necessary or desirable.

In adjusting the two plates or the wings of my dasher, the opening between them should be an inch or more, and the narrow sections of the wings should be placed parallel to each other. These sections occupy about two-fifths of the whole area of the wings, so that the wide sections will present about one-third more surface than they do. The collar B securely maintains the position and relations of the two plates, and also presents a means of securing the dasher, by a feather-key, to the spindle of the churn. The end view at fig. 4 very clearly illustrates the position of each wing in the dasher, as well as its relations to the wing that opposes it, the flaring sections being marked $b'$ and $d'$, on the right of the figure, and the parallel sections by $b$ and $d'$, whilst, on the left-hand side, the parallel sections are marked $b$ and $d$, and the oblique sections $b'$ and $d$. A proper seat or socket is secured in the centre of the churn for the lower extremity of the spindle, which, passing centrally through the top of the churn, is provided at its upper end with a pinion, F.

The effect of the action of my dasher is greatly enhanced when the churn is rectangular or square, no doubt because the corners of such a formed churn present opposing surfaces to the currents that are put in motion by the rotation of the dasher, and I greatly prefer a metallic churn to a wooden one. I place my churn on a platform, H, where it is held in position by the upright or vertical standards J J', between which it fits snugly. To the top of one of these standards the cross-table K is hinged as shown, and on it is placed and fastened the gearing to operate the dasher. This gearing consists of the shaft L, to one extremity of which the cog-wheel M is secured, and on the other the crank, N. On the drawing, the table K is shown as when not in position for operating the churn, nor yet sufficiently turned over to allow of a convenient removal of the top thereof, but its position sufficiently illustrates the manner of its adjustment to enable the dullest person to make it. When the churn is to be operated, the table K is brought down until its unhinged end rests upon the other standard, to wit, J, to which it is firmly secured by means of the pins or spikes, and the hook O and eye-bolt S. In this position of the table K, the driving-cog wheel M is in connection with the pinion F, and hence in position to operate the dasher, through the agency of the crank, N.

In the operation of my dasher, it is not rotated continuously in either direction, but only for a few revolutions in one way, when the motion is reversed for a like number of revolutions, and so on, until the butter comes, which almost invariably will be within the space of four minutes or less.

Having thus described my invention, what I claim, and desire to secure by Letters Patent, is—

1. A churn-dasher, when composed of the plates A and C, and these plates constitute four wings, as herein described, when these wings are constructed and relatively placed with respect to each other, and are held together, and on the spindle of the churn, by the collar B, substantially as herein described, for the purpose set forth.

2. The above-described dasher, in combination with the hinged cross-table F, when the latter supports the shaft L and its appliances, as herein described, for the purpose set forth.

JOHN S. CARSON.

Witnesses:
C. W. WAILEY,
RUFUS R. RHODES.